(12) United States Patent
Lastinger et al.

(10) Patent No.: US 7,348,930 B2
(45) Date of Patent: Mar. 25, 2008

(54) METHOD AND APPARATUS FOR A RADIO TRANSCEIVER

(75) Inventors: Roc Lastinger, Cave Creek, AZ (US); John Spenik, Phoenix, AZ (US); Brian C Woodbury, Gilbert, AZ (US)

(73) Assignee: Rotani, Inc., Scottsdale, AZ (US)

( * ) Notice: Subject to any disclaimer, the term of this patent is extended or adjusted under 35 U.S.C. 154(b) by 197 days.

(21) Appl. No.: 11/275,605

(22) Filed: Jan. 19, 2006

(65) Prior Publication Data
US 2006/0164318 A1     Jul. 27, 2006

Related U.S. Application Data

(60) Provisional application No. 60/653,447, filed on Feb. 15, 2005, provisional application No. 60/646,019, filed on Jan. 21, 2005.

(51) Int. Cl.
*H01Q 21/00*     (2006.01)
*H01Q 1/52*     (2006.01)

(52) U.S. Cl. ............... 343/844; 343/841; 343/851
(58) Field of Classification Search ............. 343/841, 343/851, 844, 834
See application file for complete search history.

(56) References Cited

U.S. PATENT DOCUMENTS

| 2,272,312 | A | | 2/1942 | Tunick |
| 3,681,770 | A | | 8/1972 | Andrew |
| 4,101,901 | A | * | 7/1978 | Kommrusch ............... 343/853 |
| 6,069,591 | A | * | 5/2000 | Smith ....................... 343/799 |
| 6,914,577 | B2 | * | 7/2005 | McCandless ............... 343/841 |
| 2002/0149534 | A1 | | 10/2002 | Bobier |
| 2004/0150580 | A1 | | 8/2004 | Gaudette et al. |
| 2004/0183726 | A1 | | 9/2004 | Theobold |
| 2004/0217913 | A1 | | 11/2004 | McCandless |

FOREIGN PATENT DOCUMENTS

FR     2785488     5/2000

OTHER PUBLICATIONS

International Search Report dated May 31, 2006.

* cited by examiner

*Primary Examiner*—Hoang V Nguyen
(74) *Attorney, Agent, or Firm*—Letham Law Firm LLC; Lawrence Letham (57) ABSTRACT

A wireless radio transceiver which reduces interference between antennas positioned in substantially close proximity is disclosed. The exemplary radio transceiver comprises at least two radios, at least one antenna interfacing with each of the radios, at least one antenna spacer mounted to each of the antennas, and at least one shield, wherein each of the antenna spacers are mounted to one of the shields.

18 Claims, 9 Drawing Sheets

METHOD AND APPARATUS FOR A RADIO TRANSCEIVER

CROSS-REFERENCE TO RELATED APPLICATIONS

This application claims priority to, and the benefit of, U.S. provisional application Ser. No. 60/646,019 filed on Jan. 21, 2005 and U.S. provisional application Ser. No. 60/653,447 filed on Feb. 15, 2005, which are hereby incorporated by reference in their entirety.

BACKGROUND OF THE INVENTION

1. Field of the Invention

This invention pertains generally to wireless communication, and more particularly, to a method and apparatus for a radio transceiver.

2. Description of Related Art

Wireless radio transceivers find uses in a variety of applications such as, for example, providing communication between computers, file servers, and other wireless devices. A wireless radio transceiver may substantially benefit from a system that reduces interference between antennas positioned in substantially close proximity.

BRIEF SUMMARY OF THE INVENTION

A radio transceiver, according to various aspects of the present invention, includes a first radio and a second radio, a first antenna and a second antenna, a first antenna spacer and a second antenna spacer, and a shield. The first radio and the second radio transmit and receive using a first frequency and a second frequency respectively. The first antenna and the second antenna have a first coverage area and a second coverage area respectively. The first antenna and the second antenna couple to the first radio and the second radio respectively. The first antenna spacer and the second antenna spacer mount to the first antenna and the second antenna respectively. The shield has a size, a first side, and a second side. The first antenna spacer mounts to the first side thereby positioning the first antenna a first distance from the first side. The second antenna spacer mounts to the second side thereby positioning the second antenna a second distance from the second side. A distance between the first antenna and the second antenna comprises at most two times the wavelength of at least one of the first frequency and the second frequency. The first coverage area overlaps the second coverage area thereby forming at least one virtual sector.

A radio transceiver, according to various aspects of the present invention, includes a first radio and a second radio, a first group of at least two antennas and a second group of at least two antennas, and a shield. The first radio and the second radio transmit and receive using a first frequency and a second frequency respectively. Each one of the antennas of the first group and the second group have a respective coverage area. The antennas of the first group and the antennas of the second group couple to the first radio and the second radio respectively. The shield has a size, a first side, and a second side. The at least two antennas of the first group mount to the first side at respective first group antenna positions. The at least two antennas of the second group mount to the second side at respective second group antenna positions. The at least two antennas of the first group operate as a first MIMO antenna. The coverage area of each one of the at least two antennas of the first group substantially overlaps the coverage area of every other antenna of the first group thereby forming a third coverage area. The at least two antennas of the second group operate as a second MIMO antenna. The coverage area of each one of the at least two antennas of the second group substantially overlaps the coverage area of every other antenna of the second group thereby forming a fourth coverage area. A distance between the first group and the second group comprises at most two times the wavelength of at least one of the first frequency and the second frequency. At least one of the size, the first group antenna positions, and the second group antenna positions is adjusted in such a manner that the third coverage area overlaps the fourth coverage area thereby forming at least one virtual sector.

A method for adjusting interference. The method includes in any practical order: (a) selecting an antenna; (b) detecting at least one of an interference and a data throughput as received by the selected antenna; (c) adjusting at least one of a shield size, a shield spacing, an antenna position relative to a shield, and an antenna spacer size; and (d) repeating selecting, detecting, detecting, and adjusting until a desired threshold of at least one of the virtual sector size, the interference and the data throughput for each antenna is attained.

A radio transceiver that provides at least two virtual sectors. The transceiver includes a first radio, a second radio, a first directional antenna, and a second directional antenna. The first radio and the second radio transmit and receive using a first channel and a second channel respectively. The first directional antenna and a second directional antenna include a first coverage area and a second coverage area respectively. The first antenna and the second antenna couple to the first radio and the second radio respectively. The first coverage area overlaps the second coverage area on a first side thereby forming a first virtual sector. The first coverage area overlaps the second coverage area on a second side thereby forming a second virtual sector. The first virtual sector does not overlap the second virtual sector. The first channel and the second channel comprise different channels.

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

DETAILED DESCRIPTION OF EXEMPLARY EMBODIMENTS

The accompanying drawings show exemplary embodiments by way of illustration and best mode. While these exemplary embodiments are described, other embodiments may be realized and changes may be made without departing from the spirit and scope of the invention. Thus, the detailed description is presented for purposes of illustration only and not of limitation. For example, the steps recited in any of the method or process descriptions may be executed in any suitable order and are not limited to the order presented. The number of radios, types of radios, types of antennas, antenna placement, spacer size and type, and shield shape, size and material may be varied without departing from the spirit and scope of the invention; thus the scope is not limited by the embodiments or examples given.

This application incorporates by reference U.S. utility application Ser. No. 10/869,201 filed on Jun. 15, 2004, and U.S. utility application Ser. No. 10/880,387 filed on Jun. 29, 2004 in their entirety for the teachings taught therein. For the sake of brevity, conventional data networking, wireless technology, antenna operation, radio operation, standard communication protocols, electronic capabilities, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. The present invention may be embodied as a customization of an existing system, an add-on product, or a distributed system.

The present invention is described partly in terms of functional components and various methods. Such functional components may be realized by any number of components configured to perform the specified functions and achieve the various results. For example, the present invention may employ various types of radios using any type of communication protocol and operating at any frequency or with any number of channels suitable for the application. The present invention may use any variety of antennas or groups of antennas for any purpose such as, for example, transmission, reception, noise reduction, multipath detection or any other suitable purpose. Antenna spacers may be formed of various materials such as, for example, dielectric, plastic, metal, biological material, or any suitable material. Shields may be fashioned in any shape, size, and from materials that reflect, absorb, or are neutral to radio waves such as, for example, steel, aluminum, iron, and other suitable material.

In addition, the present invention may be practiced in conjunction with any number of applications and environments, and the systems described are merely exemplary applications of the invention. Further, the present invention may employ any number of conventional techniques for manufacture, testing, identifying wireless clients, connecting, and communicating with wireless clients, communicating with other radio transceivers, and the like.

As used herein, the term "throughput" means the number of bits transmitted and/or received per second. Throughput may be generally categorized in two classes, namely total throughput and usable data throughput. Total throughput includes all bits transmitted and/or received between two devices. Total throughput includes, for example, overhead required by the communication protocol, retransmitted data, and data. Total throughput conceptually may relate to bandwidth in that total throughput is the total number of bits transmitted for the available bandwidth. As available bandwidth increases, total throughput may also increase. Usable data throughput refers to the actual data transmitted and/or received. Usable data throughput excludes, for example, bits dedicated to overhead. Usable data throughput is the number of data bits transmitted and/or received per second. Usable data throughput is also referred to as data throughput. Data throughput may be related to bandwidth, but it is also influenced by other factors such as, for example, the presence of noise, a high error rate, or other factors that required communicating devices to decrease their rate of transmission and/or to retransmit data. Data throughput may be increased, for example, by decreasing the influence of noise on reception, decreasing the need to retransmit, increasing the transmission and/or reception rates, and increasing available transmission and/or reception bandwidth.

Methods and apparatus according to various exemplary embodiments of the present invention comprise a radio transceiver having radios, antennas, antenna spacers and shielding. The radio transceiver is adapted communicate with other wireless devices through the transmission and reception of radio signals. Multiple radios and/or multiple antennas in a radio transceiver may enable the radio transceiver to communicate with different wireless devices, for example clients, simultaneously thereby increasing data throughput. However, positioning multiple antennas in substantially close proximity may cause interference between the antennas in various ways and of such magnitude, that data throughput decreases. Antenna spacers and shielding may reduce interference between the antennas. The size of the antenna spacer may modify radio interference between antennas in addition to the antenna's coverage area, gain, bandwidth, and detuning. The size, shape, and thickness of a shield may modify near-field interference between antennas and antenna coverage area. Antenna coverage areas may also be adjusted to form virtual sectors that may occur when the coverage area of two antennas overlap. The methods and apparatus of a radio transceiver having radios, antennas, antenna spacers, and shielding may be used for any suitable purpose or combination of purposes such as, for example, providing wireless service to clients in an office or home, routing data wirelessly between radio transceivers, interfacing between wireless devices and a wired network, or any other suitable application. The methods and apparatus may be adapted to any system configured to use antennas in substantially close proximity.

Figure 1:
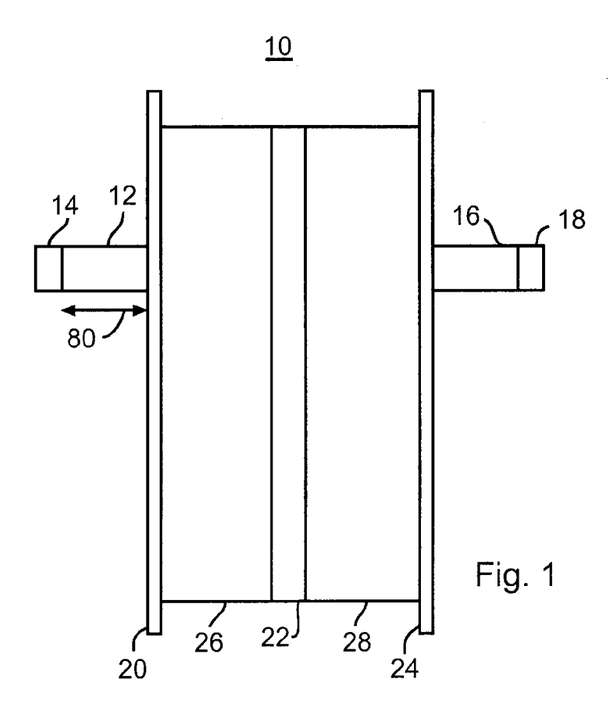
FIG. 1 is a diagram of a side view of a radio transceiver with two radios and one antenna interfacing with each radio in accordance with one embodiment of the present invention.

In particular, referring to FIG. 1, a radio transceiver 10 according to various exemplary embodiments of the present invention comprises two radios 26 and 28; two shields 20, and 24; two antenna spacers 12 and 16; two antennas 14 and 18, and system electronics 22. The radios 26, 28 may communicate using I.E.E.E. 802.11 or similar protocols and channels. The antennas 14, 18 may be configured to operate over the range of I.E.E.E. 802.11 frequencies. The antenna spacers 12, 16 position the antennas at a distance from their respective shields and from each other. The system electronics 22 may perform a variety of functions such as, for example, providing access to a wired network, interfacing between the radios, providing a connection to a computer and/or other electronic device, and any other function for a particular application. The shields 20, 24, and the antenna spacers 12, 16, referring to FIG. 7, may shape the areas of coverage 30 and 32 of antennas 14 and 18, respectively. The shape and size of the coverage areas may decrease interference between antenna coverage areas 30 and 32 and antennas 18 and 14. Coverage areas 30 and 32 may also overlap to form virtual sectors 34 and 36.

With respect to the radios, radios 26, 28 may be of any type, shape, size, and configuration for a particular application or environment. The radios 26, 28 may operate using any protocol, frequency, and channel such as, for example, the protocols and channels for at least one of I.E.E.E. 802.11a, I.E.E.E. 802.11b, I.E.E.E. 802.11g, I.E.E.E. 802.15, I.E.E.E. 802.16, Bluetooth and ultra-wideband. Radios 26, 28 may integrate with any type of electronics for a particular application such as, for example, electronics for Multiple Input Multiple Output (MIMO) antennas, adaptive array antennas, a switch, a network router, and data storage. Radios may be configured to operate with any type of antenna or group of antennas, for example, a radio may be split into a back-end with multiple front-ends to service MIMO antennas. Radios 26, 28 may be of any physical dimension, have any type of connectors, have any form factor, and be contained in any type of packaging. For example, in one embodiment, each radio is packaged in a metal container. Radios 26, 28 may have a diversity switch and/or another type of antenna sharing device that enables the radio to interface with at least two antennas.

Figure 2:
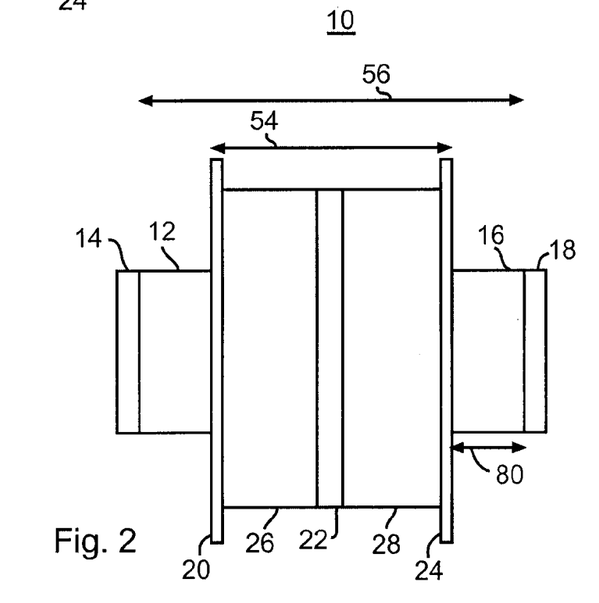
FIG. 2 is a diagram of a top view of a radio transceiver in accordance with one embodiment of the present invention.
Figure 3:
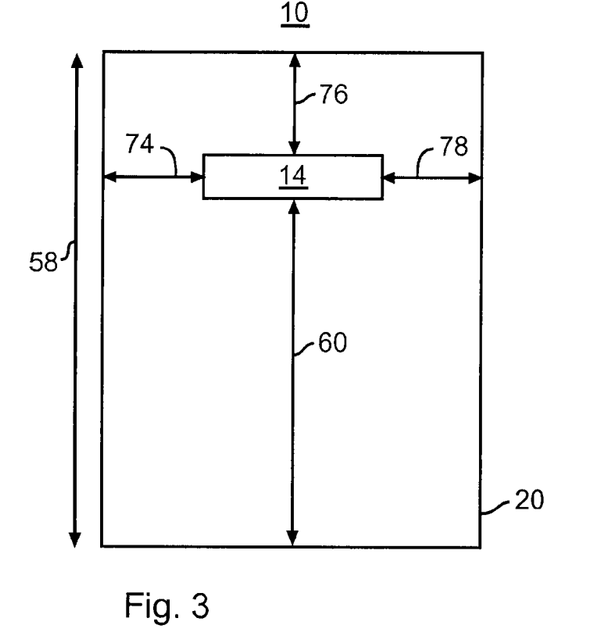
FIG. 3 is a diagram of a front view of a radio transceiver with two radios and one antenna interfacing with each radio in accordance with one embodiment of the present invention.
Figure 10:
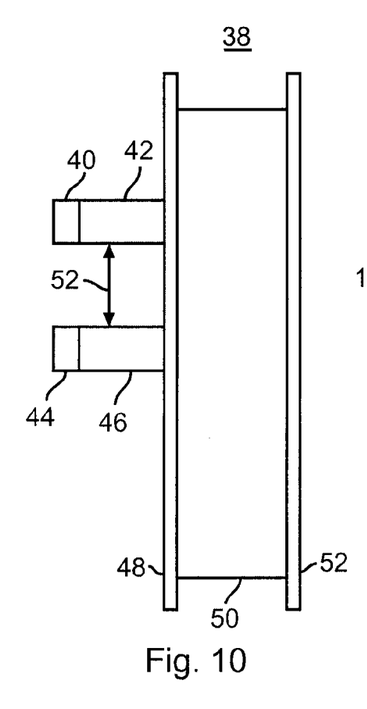
FIG. 10 is a diagram of a side view of a radio transceiver with one radio and two antennas in accordance with one embodiment of the present invention.
Figure 11:
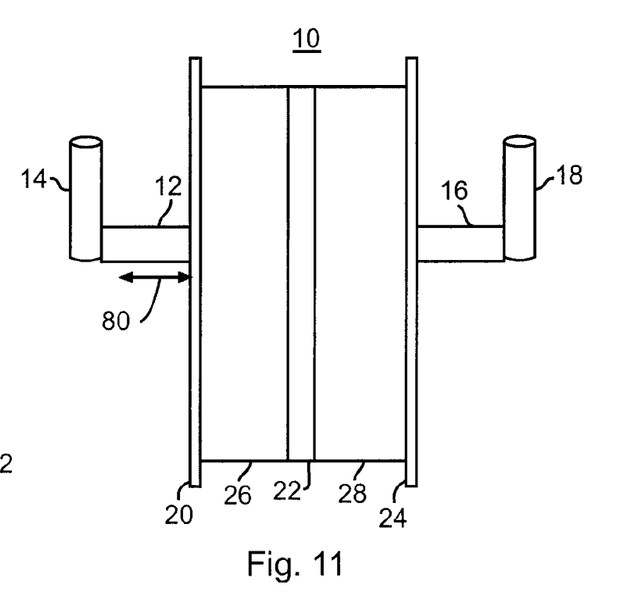
FIG. 11 is a diagram of a side view of a radio transceiver with two radios and one whip antenna interfacing with each radio in accordance with one embodiment of the present invention.

In an exemplary embodiment, the radios 26, 28 are configured to operate using the I.E.E.E. 802.11a/b/g protocols. Referring to FIGS. 1-3, radio 26 interfaces with antenna 14 and radio 28 interfaces with antenna 18. Radio 26 is located substantially adjacent to shield 20 and radio 28 is located substantially adjacent to shield 24. In another embodiment, referring to FIGS. 5-6, radios 26 and 28 each use an electronic device such as, for example, a diversity, an antenna combiner, an antenna sharing device, and an RF switch, to enable radio 26 to interface with antennas 14 and 64 and radio 28 to interface with antennas 18 and 70. In another embodiment, referring to FIG. 10, a single radio 50 interfaces using an electronic device such as, for example, a diversity switch, an antenna combiner, an antenna sharing device, and an RF switch, with antennas 40 and 44. In another embodiment, referring to FIGS. 5-6, radios 26 and 28 each use an electronic device such as, for example, a diversity switch, an antenna combiner, an antenna sharing device, and an RF switch, such that radio 26 interfaces with antennas 14 and 18 and radio 28 interfaces with antennas 64 and 70.

Mounting antennas on shields may reduce the noise detected by an antenna from a selected direction. For example, referring to FIGS. 1 and 7, noise signals from a source positioned on the same side of shield 24 as antenna 18 (to the right of shield 24) may be reduced in strength by shield 24 and shield 20 before they reach antenna 14, thereby reducing interfere of the noise source with antenna 14. A radio that uses shields and antennas placed on opposing sides of shields, such as shown in FIG. 1, may use the antenna that provides the best signal with the least amount of interference from a noise source. For example, if a noise source is situated to the right of shield 24, antenna 14 may provide communication for any given client with the least interference. The radios may cooperate with each other in any manner. For example, when radio 26 experiences interference, radio 26 may allow radio 28 to perform all communication duties, continue to function in spite of the interference, change to a new channel not used by radio 28, or shift high priority communications to radio 28 and accept low priority communications from radio 28.

The radios of a radio transceiver are not limited to using the same protocol, frequencies, and channels. For example, referring to FIG. 1, radio 26 may be configured to operate using one communications protocol while radio 28 may be configured to operate using another communications protocol. More specifically, radio 26 may be configured to operate using I.E.E.E. 802.11a while radio 28 may be configured to operate using I.E.E.E. 802.11b/g. The same technique may apply to radios that interface with more than one antenna.

Figure 7:
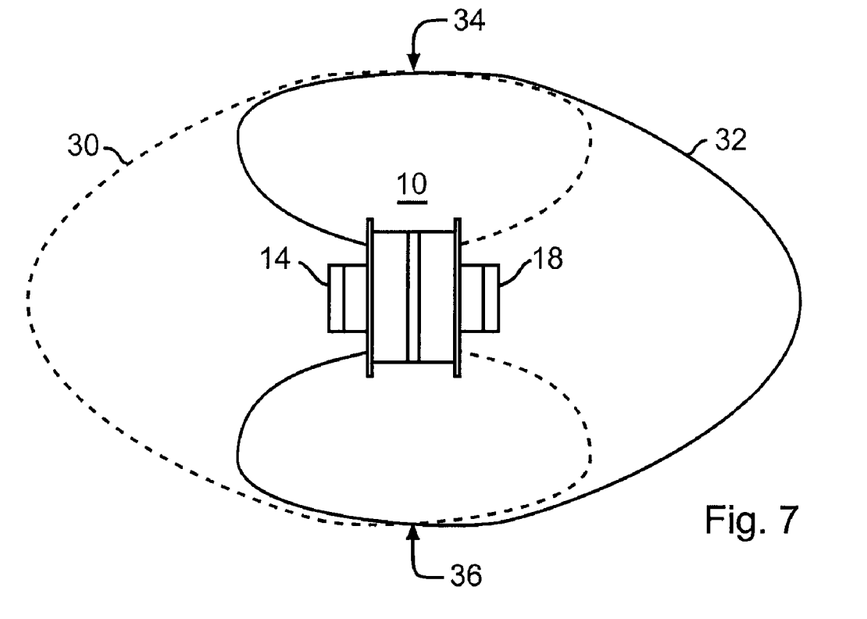
FIG. 7 is a diagram of a two-dimensional view of the coverage area of a radio transceiver having two radios in accordance with one embodiment of the present invention.
Figure 8:
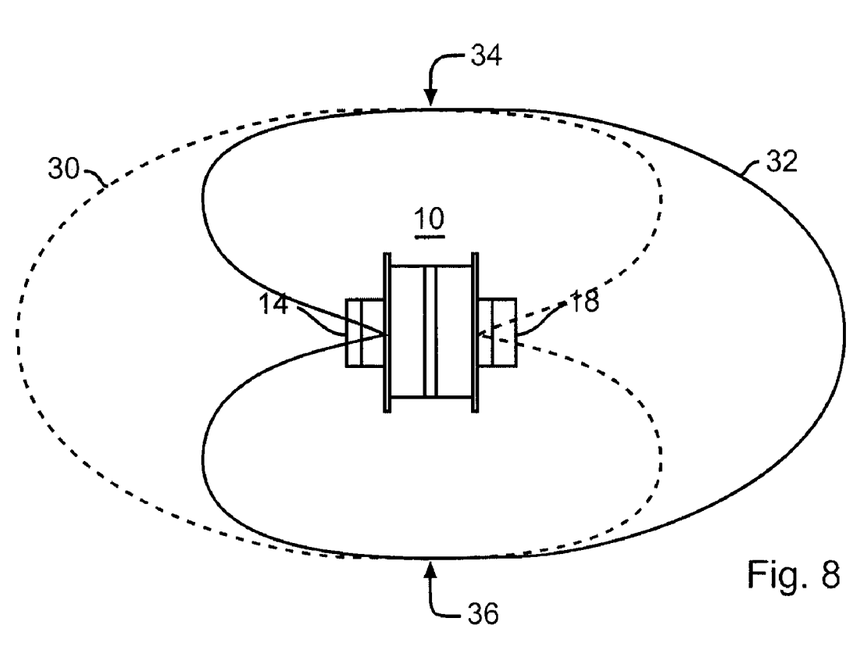
FIG. 8 is a diagram of a two-dimensional view of the coverage area of a radio transceiver having two radios with increased coverage area and increased interference in accordance with one embodiment of the present invention.
Figure 9:
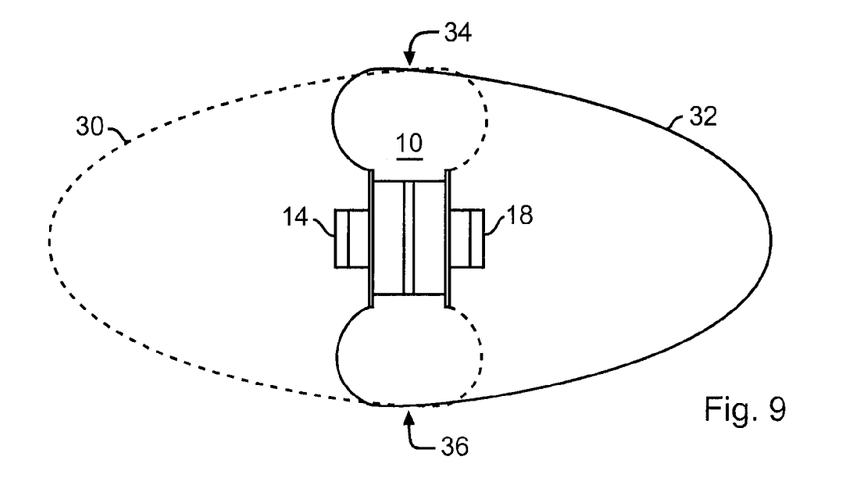
FIG. 9 is a diagram of a two-dimensional view of the coverage area of a radio transceiver having two radios with reduced coverage area and reduced interference in accordance with one embodiment of the present invention.
Figure 12:
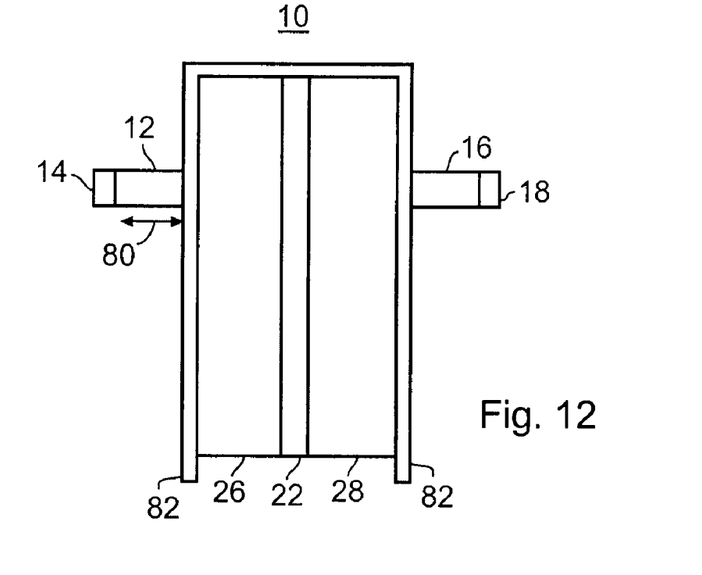
FIG. 12 is a diagram of a side view of a radio transceiver with two radios and one antenna interfacing with each radio and a shield formed as a single piece in accordance with one embodiment of the present invention.

With respect to shields, shields 20, 24 may be of any material or combination of materials suitable for an application or environment. Referring to FIGS. 7-9, the material used to form a shield may reflect and/or absorb radio waves in such a manner as to modify the shape of antenna 14 and 18 coverage areas 30 and 32, respectively. Shields may also use a material that absorbs and/or inhibits near-field interference. One component of near-field interference may be the magnetic field produced by antennas 14, 18. Exemplary materials for shields may include steel, aluminum, electroplated aluminum, iron, and other suitable material. Shields may be of any shape such as, for example, rectangular, hexagonal, square, angular, concave, convex, and other shape suitable for a desired application. For example, referring to FIG. 12, shields 20 and 24 of FIG. 1, may be implemented as a single shield 82. In another embodiment, referring to FIG. 13, shield 84 may have multiple sides for mounting antennas 14, 18 antennas spacers 12, 16 and for shielding the antennas from the radios 26, 28 and system electronics 22. Shields may be of any size and/or thickness. In a suitable environment, the metallic case used on some radios may act as a shield. The shields 20, 24 may be substantially larger than the radios 26, 28, and/or substantially larger than antennas 14, 18. The size of the shields 20, 24 may also be related to the wavelength of the radio signals used by the radios 26, 28 and/or the antennas 14, 18.

Figure 13:
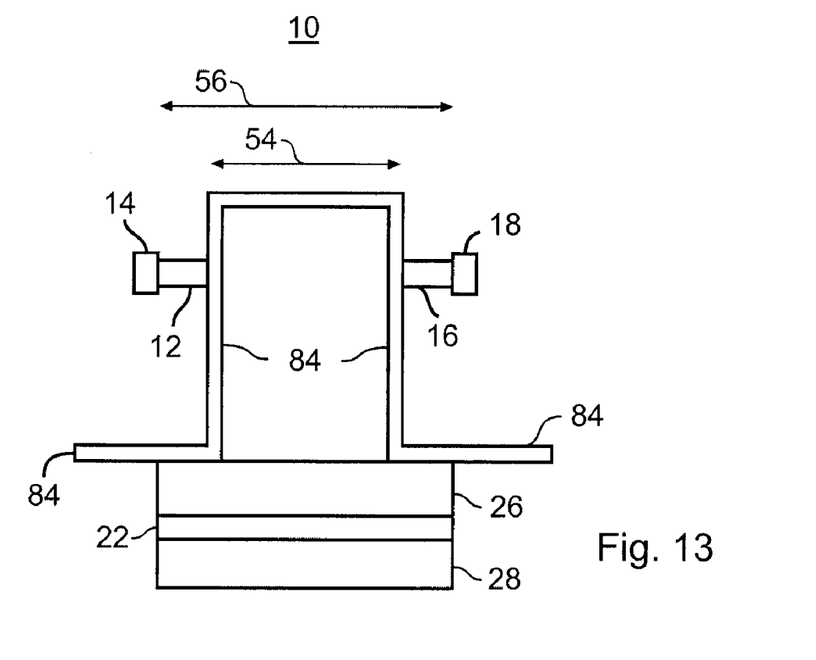
FIG. 13 is a diagram of a side view of a radio transceiver with two radios and one antenna interfacing with each radio and a shield formed as a single piece in accordance with one embodiment of the present invention.

The space between shields 54 may be any distance suitable for an application or environment. The minimum spacing between shields 54 may be set by the thickness of the radios 26, 28 and system electronics 22 placed substantially adjacent; however, there is no limitation on providing additional spacing between shields to achieve a desired purpose such as, for example, modifying the shape of an antenna's coverage area, decreasing near-field, and decreasing radio wave interference between antennas. Referring to FIG. 13, the space between shields 54 may be a distance less than the width of the radios 26, 28 and the system electronics. The spacing between shields 54 may also be set as a multiple of the length of the wave used by the radios 26, 28 and/or the antennas 14, 18. In an exemplary embodiment, referring to FIGS. 2 and 13, distance 54 is a factor of the length of the wavelength used for communication such that the distance 54 is less than two times the wavelength. The space between shields 54 may also be a factor in setting the space between antennas 56. The space between antennas 56 may also be a factor of the length of the wavelength used by the radios 26, 28 and/or the antennas 14, 18. Antennas 14, 18 may be mounted substantially close such that, in an exemplary embodiment and referring to FIGS. 2 and 13, distance 56 is less than two times the wavelength used by antennas 14, 18. The radios 26, 28 may interface with the radios 14, 18, system electronics 22, antennas spacers 12, 16, and antennas 14, 18 in any manner. For example, the shields 20 and 24 may mount directly to one or more of the radios and/or system electronics or to a frame that supports the radios, the system electronics, and the shields.

The material, size, spacing, and shape of the shields 20, 24 may be modified in any manner to produce a desired result. For example, adjusting shield size, shape, and spacing 54 may reduce radio interference between the antennas 14, 18. For example, referring to FIGS. 7-9, shield size, shape, and spacing may assist in shaping the coverage areas 30, 32 to form a null in coverage area 30 in the vicinity of antenna 18 and a null in coverage area 32 in the vicinity of antenna 14. More specifically, adjusting the size, shape, and spacing of the shields may decrease the interference between the coverage area 30 and antenna 18 and between coverage area 32 and antenna 14. Further, the material, size, and placement of the shields 20, 24 may reduce interference between the radios 26, 28 and the antennas 14, 18 and/or between the system electronics 22 and the antennas 14, 18. Additionally, the shield material and the spacing between the antennas 56 may act to reduce near-field interference between the antennas 14, 18. The shields may also serve any secondary purpose, for example, functioning as a heat sink, shielding the radios from each other, providing a ground plain, forming the outer case of the radio transceiver 10, providing a surface finish, and providing connecting points for mounting the radio transceiver 10 and/or system electronics 22. The number of shields is not limited. For example, additional shields, shields in addition to shields 20 and 24, may assume any position and be used for any purpose.

In an exemplary embodiment, referring to FIGS. 1-3, the shields 20, 24 are $63/1000$ inch thick aluminum plates that are substantially rectangular. Shield 20 may be positioned on one side of radio 26 and shield 24 on one side of radio 28. In an exemplary embodiment, the width and length dimensions of the shields 20, 24 may be larger than the length of the wavelength of the frequency used by the radios 26, 28 and/or the antennas 14, 18. The spacing between the shields may be determined by the size and positioning of the radios 26, 28, and/or the system electronics 22. Antenna spacers 12 and 16 mount to shield 20 and 24, respectively.

Figure 4:
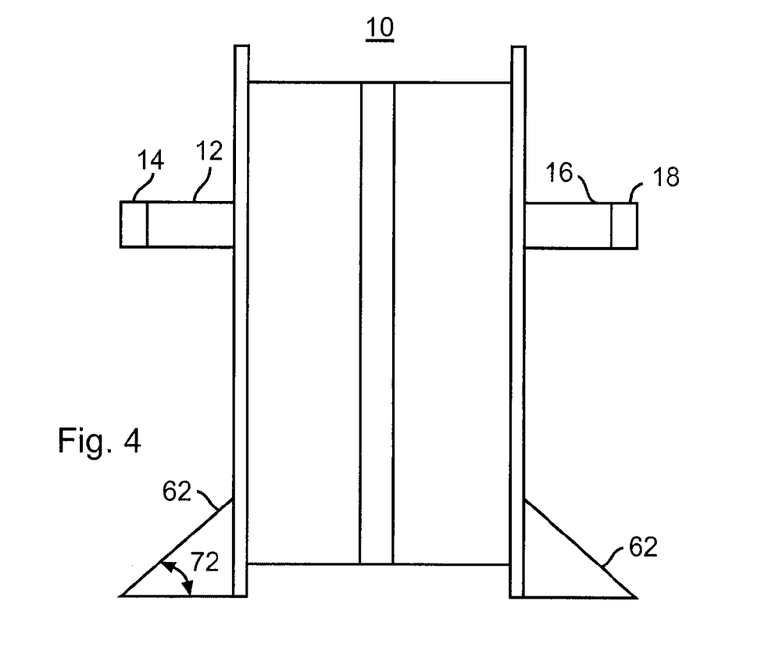
FIG. 4 is a diagram of a side view of a radio transceiver with angled shields in accordance with one embodiment of the present invention.

A shield may be a single piece of material or an assembly of multiple pieces of the same and/or different materials. In one embodiment, referring to FIG. 4, angled shields 62 connect to the shields 20, 24 and reduce interference between the antennas 14, 18 that occurs around the bottom of the radio transceiver 10. The length of angled shield 62 and/or spacing from antennas 14 and 18 may be related to the wavelength of the signals used by the radios 26, 28 and/or the antennas 14, 18. Angle 72 of angled shield 62 may be any value in the range of 0 to 90 degrees. In one embodiment, angle 72 of the angled shield 62 is approximately 45 degrees. In another embodiment, referring to FIG. 13, angle 72 is zero degrees and the angled shields 62 are part of a single shield 84. Angled shields 62 may also be positioned above antenna 14 and 18 and/or in any other suitable position relative to the antennas 14, 18.

With respect to antennas, antennas 14, 18, referring to FIGS. 1-3, 5, and 11, may be of any type, shape, size, and configuration for an application or environment. The antennas 14, 18 may be, for example, omni-directional, directional, patch, phased array, adaptive array, MIMO, and other suitable antenna type or arrangement of multiple antennas configured to interface with a radio. The antennas may interface with the radios in any manner and for any suitable purpose. The signals from the antennas may interface directly with the radios or be pre-processed before going to a radio by any suitable circuit, for example, an attenuator, an AGC, a weighting circuit, a gain circuit, a filter, a diversity switch, and an antenna sharing device. Antenna signals may be manipulated for any suitable purpose, for example, to combine the signals from an array of antennas, to use MIMO antennas to send or receive signals, and to select the best antenna from multiple antennas. The antennas 14, 18 are not required to be the same type and/or to have the same characteristics. In one embodiment, antenna 14 may be an omni-directional antenna and antenna 18 an adaptive array. In another embodiment, antenna 14 may be a directional antenna and antenna 18 a MIMO antenna. In another embodiment, both antennas 14 and 18 may be directional antennas, yet provide different angles of coverage. Additionally, antennas 14, 18 may have any orientation with respect to the shields 20, 24 such as, for example, horizontal, vertical, and any other suitable angle and that may polarize the radio signal at any angle. The space between antennas 56 may be any suitable distance for an application or environment.

In an exemplary embodiment, referring to FIG. 1, the antennas 14, 18 are low magnetic field, omni-directional antennas configured to function at frequencies required by the I.E.E.E. 802.11a/b/g communication protocols. Antennas 14 and 18 are mounted to antenna spacers 12 and 16 respectively. The antenna spacers 12, 16 are mounted to the shields 20, 24. In an exemplary embodiment, the antennas 14, 18 mount horizontally with respect to the top of the shields 20, 24. The space between the shields 54, the shield thickness, and the size of the antennas spacers 12, 16 result in a distance between the antennas 56 is less than about two times the length of an I.E.E.E. 802.11a/b/g wavelength.

Each antenna may be positioned relative to the shield to which it is mounted in any suitable manner for any suitable purpose such as, for example, to reduce interference between the antennas, reduce interference between the antennas 14, 18 and the radios 26, 28, reduce interference between the antennas 14, 18 and the system electronics 22, and form the coverage areas 30, 32 associated with each antenna 14, 18. For example, referring to FIG. 3, antenna 14 is positioned distance 76 from the top of shield 20, distance 74 and 78 from the left and right sides of the shield 20 respectively, and distance 60 from the bottom of the shield 20. Increasing distance 76 reduces interference between antennas 14 and 18 that may occur over the top of the shield, increasing distances 74 and 78 reduces interference between antennas 14 and 18 that may occur around the sides of the shield, and increasing distance 60 reduces interference between antennas 14 and 18 that may occur around the bottom of the shield 20. Distances 74, 76, 78, and 60 relate to the wavelength used by the radios 26, 28 and/or the antennas 14, 18. For example, distances 74, 76, and 78 may each be the same or different fraction or multiple of the wavelength used by antenna 14. In an exemplary embodiment, distances 74, 76, 78, and 60 are as long as the wavelength of an 801.11a/b/g center frequency. Angled shields, referring to FIG. 4, may also contribute to reducing interference around the edge of a shield.

Figure 5:
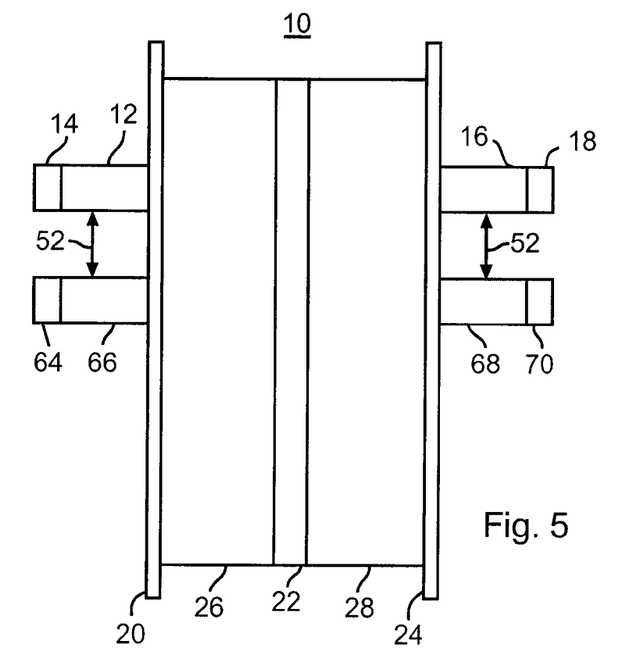
FIG. 5 is a diagram of a side view of a radio transceiver with two radios and two antennas interfacing with each radio in accordance with one embodiment of the present invention.
Figure 6:
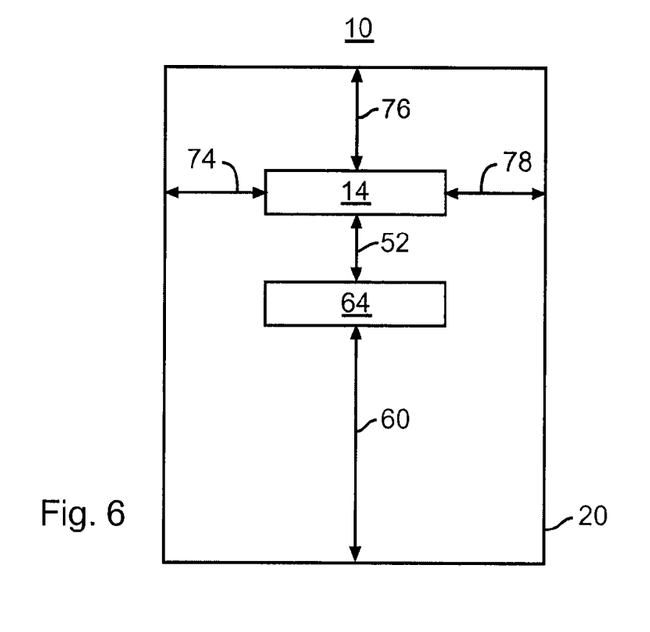
FIG. 6 is a diagram of a front view of a radio transceiver with two antennas in accordance with one embodiment of the present invention.

Radio transceivers with two or more antennas per radio may position the antennas relative to the shield in any manner to reduce interference between antennas. Referring to FIG. 5-6, antennas 14 and 64 service radio 26 while antennas 18 and 70 service radio 28. Antennas 64 and 70 are positioned a distance 52 from antennas 14 and 18 respectively to reduce interference between the antenna pairs of 14, 64 and 18, 70. Additionally, antennas 64 and 70 are positioned similarly to antennas 14 and 18 with respect to the sides of shields 20 and 24 to reduce interference that may occur around the top, sides, and bottom of the shields 20, 24. Distances 52 may correspond to the wavelength used by the radios 26, 28 and/or the antennas 14, 64, 18, 70. In an exemplary embodiment, distance 52 is a factor of about one-quarter times the length of the wavelength. Increasing distance 52 may also reduce near-field interference between antenna pairs 14, 64 and 18, 70. For example, the near-field interference between antennas 14 and 64 may decrease when distance 52 increases. In an exemplary embodiment, distance 52 between antenna pairs 14, 64 and 18, 70 is substantially about one-quarter of the length of the I.E.E.E. 802.11a and/or I.E.E.E. 802.11b/g center frequency.

Figure 14:
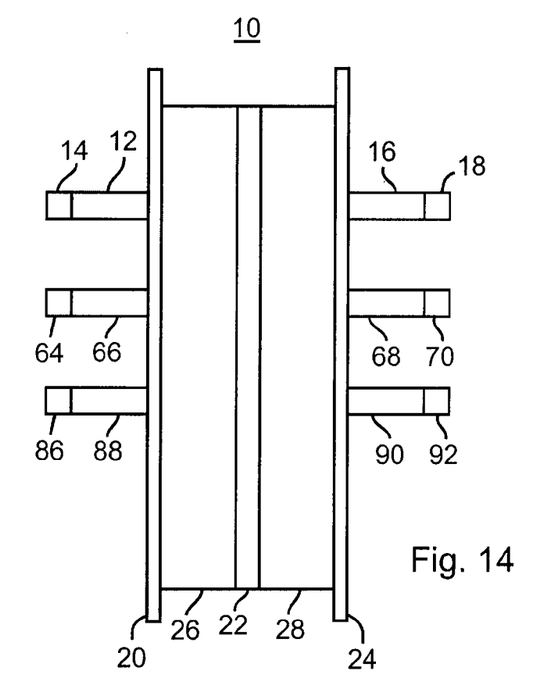
FIG. 14 is a diagram of a side view of a radio transceiver with two radios and three antennas operating as a Multiple Input Multiple Output (MIMO) antenna interfacing with each radio in accordance with one embodiment of the present invention.
Figure 15:
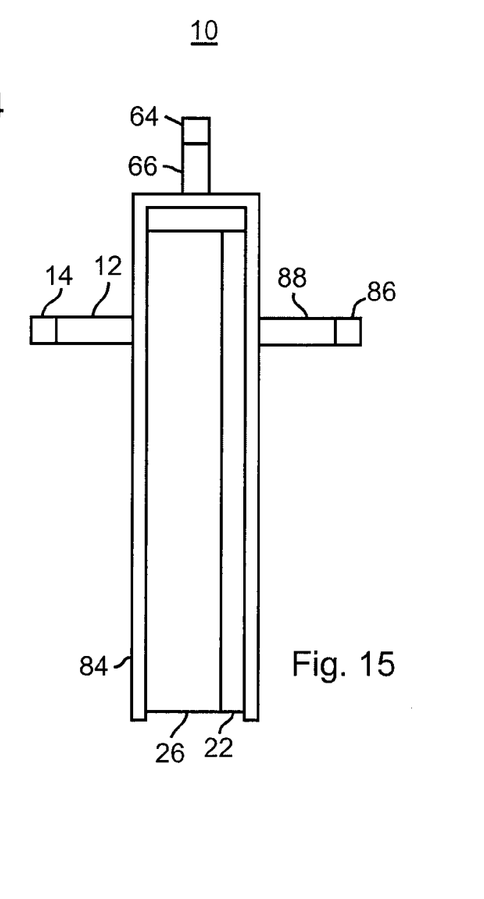
FIG. 15 is a diagram of a side view of a radio transceiver with one radio and three antennas operating as a MIMO antenna interfacing with the radio in accordance with one embodiment of the present invention.

With respect to Multiple Input Multiple Output (MIMO) antennas, all configurations and applications described above apply to MIMO antennas; however, MIMO antennas may be described more particularly. Generally, a MIMO antenna is comprised of at least two antennas that interface with the same radio and function in a coordinated manner. For example, referring to FIG. 5, a MIMO antenna comprises antennas 14 and 64. The antennas that comprise a MIMO antenna may be of any type, for example, omni-directional, directional, patch, whip, helical, and yagi. Functioning as a MIMO antenna, antennas 14 and 64 operate in a coordinated manner and interface with radio 26. Antennas 18 and 70 also function as a MIMO antenna and interface with radio 28. The antennas that comprise a MIMO antenna may operate as transmit only, receive only, or transmit/receive antennas. For example, while functioning as a MIMO antenna, antenna 14 transmits signals from radio 26 and receive any signal detectable for use by radio 26, while antenna 64 only receives signals detectable for use by radio 26. In one embodiment, referring to FIG. 14, antennas 14, 64, and 86 function as MIMO antennas and interface with radio 26. Antennas 18, 70 and 92 function as MIMO antennas and interface with radio 28. Antennas 14, 86, 18, and 92 transmit and receive signals while antennas 64 and 70 function in the receive only mode. In another embodiment, referring to FIG. 15, antennas 14, 64, and 86 function as a MIMO antenna and interface with radio 26. Antennas 14 and 86 transmit and receive signals, while antenna 64 only receives signals. In an exemplary embodiment, antennas 14, 64, and 86 are omni-directional antennas. In another embodiment, antennas 14 and 86 are directional antennas and antenna 64 is an omni-directional antenna.

Figure 16:
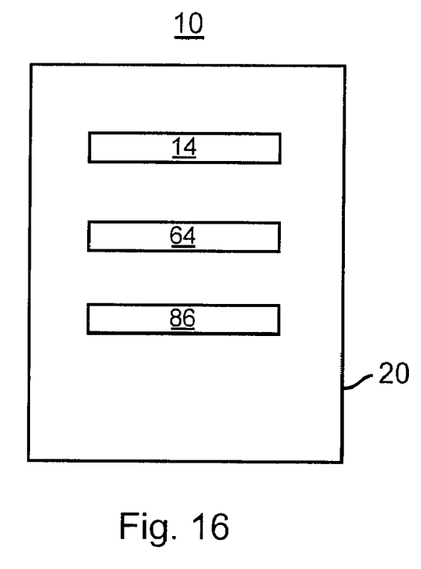
FIG. 16 is a diagram of a front view of a radio transceiver with three antennas in accordance with one embodiment of the present invention.
Figure 17:
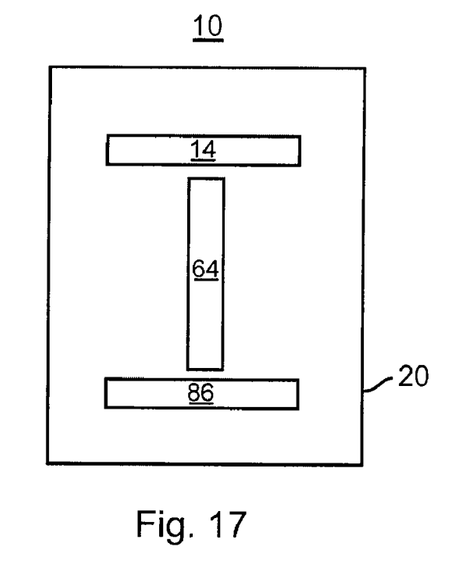
FIG. 17 is a diagram of a front view of a radio transceiver with three antennas in accordance with one embodiment of the present invention.
Figure 18:
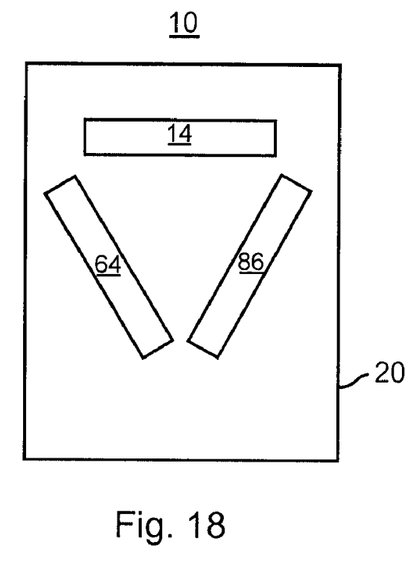
FIG. 18 is a diagram of a front view of a radio transceiver with three antennas in accordance with one embodiment of the present invention.
Figure 19:
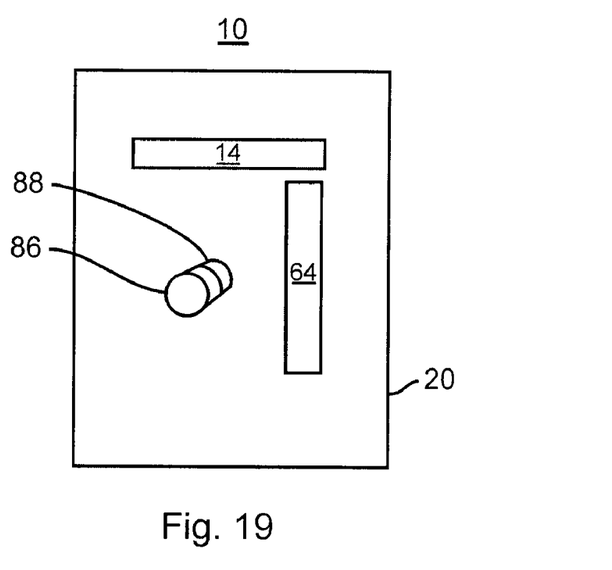
FIG. 19 is a diagram of a front view of a radio transceiver with three antennas in accordance with one embodiment of the present invention; and, FIG. 20 is a diagram of a front view of a radio transceiver with three antennas in accordance with one embodiment of the present invention.
Figure 20:
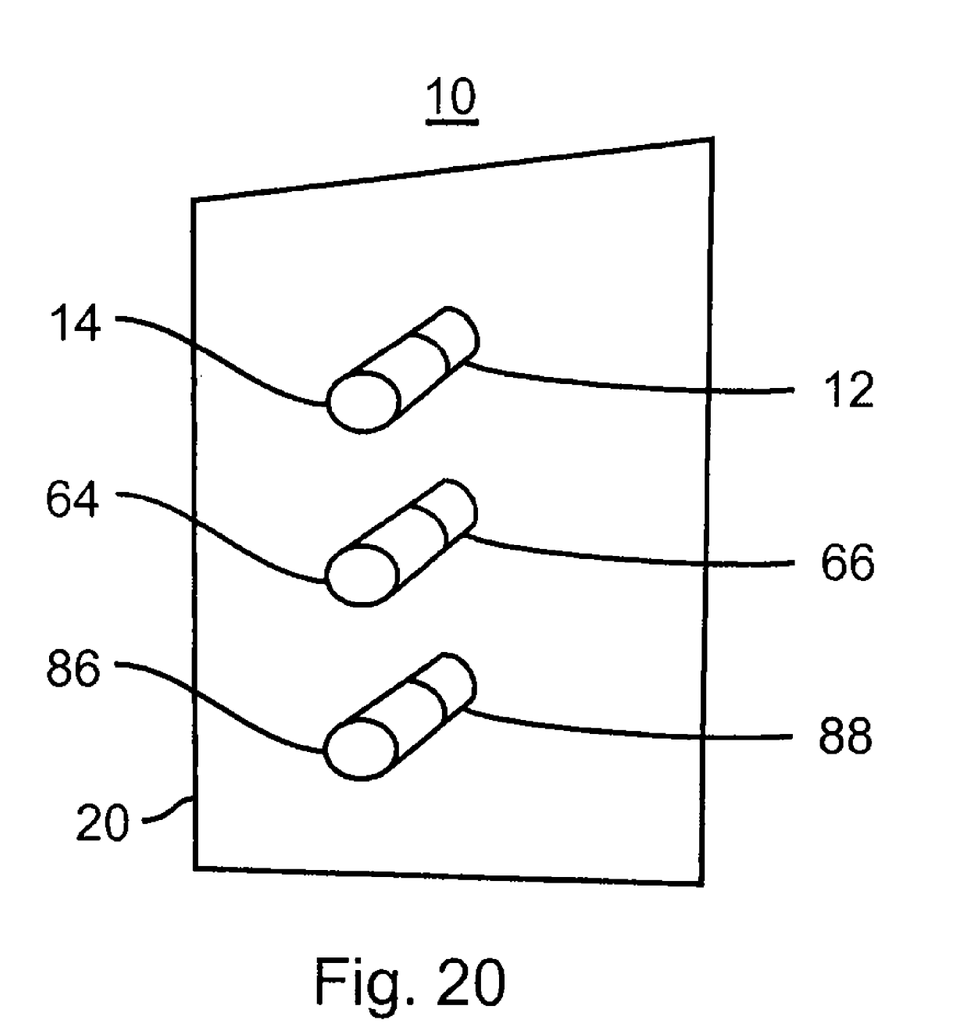

The antennas that comprise a MIMO antenna may be position in any manner with respect to each other. For example, antennas may be positioned parallel to each other, perpendicular to each other, at any particular angle with respect to each other, and in different planes. In an exemplary embodiment, referring to FIGS. 14 and 16, antennas 14, 64, and 86 are parallel to each other and parallel to the plane of shield 20. In another embodiment, referring to FIG. 17, antennas 14 and 86 are parallel to each other and antenna 64 is perpendicular to antenna 14 and antenna 86. Each antenna is parallel to the plane of shield 20. In another embodiment, referring to FIG. 18, antennas 14, 64, and 86 are positioned at approximately 60 degree angles with respect to each other and parallel to the plane of shield 20. In another embodiment, referring to FIG. 19, antennas 14 and 64 are perpendicular to each other and parallel to the plane of shield 20. Antenna 86 is orthogonal to antennas 14, 64, and perpendicular to the plane of shield 20. In another embodiment, referring to FIG. 20, antennas 14, 64, and 86 are parallel to each other and orthogonal to the plane of shield 20.

With respect to antenna spacers, referring to FIGS. 1-2, the antenna spacers 12, 16 may be of any material, size, and shape suitable for an application or environment. In an exemplary embodiment, antenna spacers 12 and 16 are formed from material that does not detune or affect the performance of antennas 14 and 18 such as, for example, plastic, nylon, Teflon, and any other material suitable for the antenna type. In another embodiment, spacers 12 and 16 are formed of a material that interacts or modifies the operation of antennas 14 and 18 in a predetermined manner, for example, metal and magnetized material. Referring to FIG. 2, antenna spacers 12, 16 position antennas 14, 18 at any distance 80 from the shield. Antenna spacers 12, 16 may support and/or make contact with any portion of antennas 14, 18. Antennas 14, 18 may mount to antenna spacers 12, 16 in any suitable manner. The mounting may be fixed or adjustable. The distance 80 that the antenna spacers 12, 16 position the antennas 14, 18 from shields 20, 24 may be fixed or adjustable. Antenna spacers 12, 16 may mount to shields 20, 24 in any suitable manner. Each antenna spacer 12, 16 may be comprised of a different type, size, and position depending on the type of antenna used and the results desired from the position of the antenna. The size of the antennas spacer and the resulting distance 80 may be set to accomplish any suitable purpose for any application or environment. For example, the size of the spacer may be adjusted to shape the antenna's coverage area, to reduce the amount the shield may detune the antenna, to reduce near-field interference between antennas, to modify the gain of an antenna, and to reduce radio interference between antennas. As described above, adjusting the shield size in conjunction with the distance between the shields 54 may contribute to achieving a distance between antennas 56 that may be less than two times the length of the wavelength used by radios 26, 28 and/or antennas 14, 18. The effects and tradeoffs of adjusting antenna spacer size are described below. An antenna that is not detuned by placement near metal may be mounted on a metal antenna spacer or directly to a metal shield.

In an exemplary embodiment, referring to FIGS. 1-2, the antenna spacers 12, 16 are made of plastic. Antenna spacers 12 and 16 are mounted to shields 20 and 24 respectively. Antennas 14 and 18 are mounted to antenna spacers 12 and 16 respectively. The size of antenna spacers 12 and 16 in conjunction with the distance between shields 54 positions antennas 14 and 18 at a distance 56 of less than two times the length of an I.E.E.E. 802.11a/b/g center frequency.

With respect to system electronics, system electronics 22 perform any type of suitable function for a desired application. The system electronics may interface with any type of system and/or component, for example, radios, antennas, wired network connections, computer busses, routers, switches, analog circuits, digital circuits, and the like. The system electronics 22 may perform functions such as, for example, communicating between radios, processing the signals from multiple antennas for use by a single radio, providing circuits to interface a radio to MIMO antennas, interfacing with a wired network, conditioning power, providing storage for transmitted and/or received data, and any other function suitable for an application or environment. The system electronics may mount to the radios, shields, and/or a frame in any manner and may interface with any system or component using any interface. The system electronics 22 may be partially and/or fully integrated with the radios and/or be functionally and physically separate from the radios. In an exemplary embodiment, the system electronics 22 provides an interface to a wired network and storage for transmit and receive data.

Any of the components or systems discussed above may perform the methods discussed herein. For example, decreasing interference between antennas in substantially close proximity and adjusting the coverage areas 30 and 32, referring to FIGS. 7-9, may be performed in any manner using any suitable radios 26, 28, system electronics 22, antennas 14, 18, antenna spacers 12, 16, and shields 20, 24. In an exemplary embodiment, decreasing interference and adjusting coverage area 30 and 32 comprises modifying the antenna spacer 12, 16 size to adjust antenna distance 80 from the shield (refer to FIG. 2), adjusting shield size, adjusting antenna position relative to the shield by adjusting distances 60, 74, 76, and 78 (refer to FIG. 3), adjusting shield spacing 54 (refer to FIG. 2), and adjusting antenna spacing 56 (refer to FIG. 2). Other methods for decreasing interference include changing the shape of the shields, for example, by adding angled shields 62 (refer to FIG. 4).

The level of interference between antennas is measured using any suitable method, for example, coverage area signal strength (i.e., null) near an opposite antenna, signal to noise levels proximate to the radio transceiver, and data throughput. Using data throughput to measure interference may account for interference between antennas, interference between antennas and radios, and interference between antennas and system electronics in addition to any interference from external noise sources. In an exemplary embodiment, data throughput is the performance factor used to detect an increase or decrease in interference.

With respect to antenna spacer size, referring to FIGS. 1-2, antenna spacers 12, 16 may be any size and may position antennas 14, 18 at any distance 80 from the shield. In general, referring to FIGS. 1, 7-9, decreasing distance 80 by decreasing the size of the antenna spacer 12 may narrow the coverage area 30, increase the gain, and decrease the bandwidth of antenna 14. Depending on the type of antenna, moving antenna 14 too close to the shield 20 may detune antenna 14. Referring to FIG. 2, adjusting antenna spacers 12 and 16 may also modify the distance between antennas 56. As discussed above, maintaining a distance that is less than two times the wavelength used by the radios 26, 28 and/or the antennas 14, 18 may decrease radio interference between the antennas. Further, increasing antenna spacers 12, 16 size may reduce near-field interference between antennas. Additionally, because distance 80, the distance of the antenna from the shield contributes to the shape of the antenna's coverage area, the size of antennas spacers 12 and 16 may contribute to the formation of virtual sectors.

The relationship between spacer size, the shape of the coverage area, and potential interference between antennas 14, 18 may be illustrated using FIGS. 7-9. Setting spacers 12 and 16 to a specific size may result in a coverage area null over the opposite antenna and the formation of virtual sectors 34 and 36. In one embodiment, referring to FIG. 7, coverage area 30 for antenna 14 wraps around the radio transceiver 10 forming virtual sectors 34 and 36, but does not substantially interfere with antenna 18. Likewise, the coverage area 32 of antenna 18 also wraps around radio transceiver 10, forms virtual sectors 34 and 36, and does not substantially interfere with antenna 14. In another embodiment, referring to FIG. 8, the size of antenna spacers 12 and 16 are increased; thereby, increasing distance 80. Increasing the distance 80 increases the coverage areas 30 and 32 of antennas 14 and 18 around radio transceiver 10. Increasing the coverage areas 30, 32 may increase the size of the virtual sectors 34, 36 and the interference between coverage area 30 with antenna 18 and coverage area 32 with antenna 14. Increasing the size of antennas spacers 12, 16 may decrease near-field interference and/or antenna detuning. In another embodiment, referring to FIG. 9, decreasing the size of the antenna spacers 12, 16 decreases the coverage areas 30, 32 and thereby decreases interference between coverage area 30 with antenna 18 and coverage area 32 with antenna 14. However, decreasing the size of the antennas spacers 12, 16 may increase near-field interference and/or antenna detuning. Decreasing the size of antenna spacers 12 and 16 may also decrease the size of the virtual sectors.

In an exemplary embodiment, referring to FIGS. 1-2 and 7, antenna spacers 12 and 16 may be adjusted to set the distance between antennas 56 to be less than two times the wavelength of the radio signals used radios 26, 28 and/or antennas 14, 18. Depending on the type of antenna, distance 80 is sufficient to reduce the effect of detuning antennas 14 and 18. Setting distance 56 to be less than two times the wavelength may result in an acceptable level of interference between antennas, near-field interference, antenna gain, antenna bandwidth, and virtual sector size. The exemplary embodiment uses the frequencies, protocol, and channels associated with the I.E.E.E. 802.11a/b/g protocols. Even though the 802.11 protocols provide minimally interfering channels (e.g., channels 1, 6, and 11) to allow transmission and reception on different channels in substantially the same physical area, the 802.11 channels may interfere with each other when antennas using different minimally interfering channels are placed in substantially close proximity. Antennas are considered to be in substantially close proximity when the distance between the antennas is less than about two times the length of the frequency used by the antennas. Adjusting antenna spacers 12 and 16 to provide an antenna distance 56 of less than two times the length of the 802.11a/b/g center frequency may reduce interference between minimally interfering channels used by antennas in substantially close proximity. Reducing interference may increase the attainable radio transceiver 10 data throughput rate.

With respect to shield size, the shields may be of any size suitable for the application. All shields may be of similar size or each shield may vary in size. Referring to FIG. 3, the size of a shield 20, 24 may affect the coverage area, reduce interference, and modify the size of the virtual sectors. A shield of a predetermined size may result in the coverage area shown in FIG. 7 where coverage area 30 does not substantially interfere with antenna 18 and coverage area 32 does not substantially interfere with antenna 14. Decreasing the size of the shields, while keeping all other factors (such as, for example, antenna spacer size, antenna size, antenna type, and antenna orientation) substantially the same, may expand the coverage areas around the sides of the shields to increase the coverage areas, virtual sectors, and levels of interference as depicted in FIG. 8. Increasing the size of the shields, while keeping all other factors substantially the same, may decrease the coverage areas around the sides of the shields to provide coverage areas, virtual sectors, and levels of interference as depicted in FIG. 9.

Referring to FIG. 3, increasing the size of the shield while maintaining the size, shape, and type of antenna 14, increases distances 60, 74, 76, and 78; therefore, increasing the space between antenna 14 and a side of shield 20 may decrease coverage area 30 around the side of shield 20 where the distance has been increased and thereby decrease the interference between coverage area 30 and antenna 18. For example, referring to FIG. 3, increasing the size of shield 20 such that distance 74 increases may decrease the area of coverage of antenna 14 around that side of shield 20. Increasing the size of the shield to increase distance 60 may decrease the area of coverage of antenna 14 around the bottom of the shield. Positioning antenna 14 such that distances 74, 76, and 78 are not substantially similar may result in an asymmetrical coverage area, asymmetrical interference, and virtual sectors 34 and 36 of different sizes. There are no limitations on antenna placement with respect to the sides of the shield. Referring to FIG. 2, increasing distance 54 may move the coverage area of one antenna farther away from the opposing antenna and may reduce interference.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises," "comprising," or any other variation, are intended to cover a non-exclusive inclusion, such that a process, method, article, or apparatus that comprises a list of elements does not include only those elements but may include other elements not expressly listed or inherent to such process, method, article, or apparatus. Section headings and titles are for document organization purposes only and do not limited the scope of the invention in any manner.

What is claimed is:

1. A radio transceiver, comprising:
    a first radio and a second radio that transmit and receive using a first frequency and a second frequency respectively;
    a first antenna and a second antenna having a first coverage area and a second coverage area respectively, the first antenna and the second antenna couple to the first radio and the second radio respectively;
    a first antenna spacer and a second antenna spacer mount to the first antenna and the second antenna respectively; and
    a shield having a size, a first side, and a second side; wherein:
    the first antenna spacer mounts to the first side thereby positioning the first antenna a first distance from the first side;
    the second antenna spacer mounts to the second side thereby positioning the second antenna a second distance from the second side;
    a distance between the first antenna and the second antenna comprises at most two times the wavelength of at least one of the first frequency and the second frequency; and
    the first coverage area overlaps the second coverage area thereby forming at least one virtual sector.

2. The radio transceiver of claim 1 wherein at least one of the first radio and the second radio is packaged in a metal container, and wherein the metal container comprises the shield.

3. The radio transceiver of claim 1 wherein at least one of the first distance and the second distance is about $^{59}\!/_{1000}$ of the wavelength of at least one of the first frequency and the second frequency.

4. The radio transceiver of claim 1 further comprising a third antenna having a third coverage area, wherein:
    the third antenna couples to the first radio;
    the first antenna and the third antenna operate as a MIMO antenna.

5. The radio transceiver of claim 4 wherein the first antenna coverage area and the third antenna coverage area substantially overlap.

6. The radio transceiver of claim 5 further comprising a fourth antenna having a fourth coverage area, wherein:
    the fourth antenna couples to the second radio;
    the second antenna and the fourth antenna operate as a MIMO antenna.

7. The radio transceiver of claim 6 wherein the second antenna coverage area and the fourth antenna coverage area substantially overlap.

8. The radio transceiver of claim 7 wherein the first antenna and the third antenna are positioned relative to each other at least one of parallel, perpendicular, at a predetermined angle, and in different planes.

9. The radio transceiver of claim 7 wherein the second antenna and the fourth antenna are positioned relative to each other at least one of parallel, perpendicular, at a predetermined angle, and in different planes.

10. The radio transceiver of claim 1 further comprising a second shield, wherein the second antennas spacer mounts to the second shield.

11. A radio transceiver, comprising:
   a first radio and a second radio that transmit and receive using a first frequency and a second frequency respectively;
   a first group of at least two antennas and a second group of at least two antennas, each one of the antennas having a respective coverage area, the antennas of the first group and the antennas of the second group couple to the first radio and the second radio respectively;
   a shield having a size, a first side, and a second side; wherein:
      the at least two antennas of the first group mount to the first side at respective first group antenna positions;
      the at least two antennas of the second group mount to the second side at respective second group antenna positions;
      the at least two antennas of the first group operate as a first MIMO antenna;
      the coverage area of each one of the at least two antennas of the first group substantially overlaps the coverage area of every other antenna of the first group thereby forming a third coverage area;
      the at least two antennas of the second group operate as a second MIMO antenna;
      the coverage area of each one of the at least two antennas of the second group substantially overlaps the coverage area of every other antenna of the second group thereby forming a fourth coverage area;
      a distance between the first group and the second group comprises at most two times the wavelength of at least one of the first frequency and the second frequency.
      at least one of the size, the first group antenna positions, and the second group antenna positions is adjusted in such a manner that the third coverage area overlaps the fourth coverage area thereby forming at least one virtual sector.

12. The radio transceiver of claim 11, wherein any two of the antennas of at least one of the first group and the second group are positioned with respect to each other at least one of substantially parallel, substantially at a predetermined angle, substantially perpendicular, and substantially in different planes.

13. The radio transceiver of claim 11, wherein at least one of the antennas of at least one of the first group and the second group is positioned with respect to the shield at least one of substantially parallel, substantially at a predetermined angle, substantially perpendicular, and substantially in a different plane.

14. The radio transceiver of claim 11, wherein at least one of the first group and the second group comprises at least one of two, three, four, five and six antennas.

15. A method for adjusting interference, comprising:
   selecting an antenna;
   detecting at least one of an interference and a data throughput as received by the selected antenna;
   detecting a virtual sector size;
   adjusting at least one of a shield size, a shield spacing, an antenna position relative to a shield, and an antenna spacer size;
   repeating selecting, detecting, detecting, and adjusting until a desired threshold of at least one of the virtual sector size, the interference and the data throughput for each antenna is attained.

16. The method of claim 15, wherein detecting the interference comprises at least one of detecting a signal strength and detecting a signal-to-noise ratio.

17. The method of claim 15, wherein the desired threshold of the data throughput comprises a maximum data throughput.

18. A radio transceiver that provides at least two virtual sectors, the transceiver comprising:
   a first radio and a second radio that transmit and receive using a first channel and a second channel respectively;
   a first directional antenna and a second directional antenna having a first coverage area and a second coverage area respectively, the first antenna and the second antenna couple to the first radio and the second radio respectively; wherein:
      the first coverage area overlaps the second coverage area on a first side thereby forming a first virtual sector;
      the first coverage area overlaps the second coverage area on a second side thereby forming a second virtual sector;
      the first virtual sector does not overlap the second virtual sector;
      the first channel and the second channel comprise different channels.

* * * * *